(12) United States Patent
Behm

(10) Patent No.: US 8,922,386 B2
(45) Date of Patent: Dec. 30, 2014

(54) MARINE LIGHTING APPARATUS AND METHODS

(76) Inventor: Michael J. Behm, Eden Prairie, MN (US)

( * ) Notice: Subject to any disclaimer, the term of this patent is extended or adjusted under 35 U.S.C. 154(b) by 0 days.

(21) Appl. No.: 13/486,924

(22) Filed: Jun. 1, 2012

(65) Prior Publication Data

US 2012/0326882 A1    Dec. 27, 2012

Related U.S. Application Data

(63) Continuation-in-part of application No. PCT/US2010/058516, filed on Dec. 1, 2010.

(60) Provisional application No. 61/265,694, filed on Dec. 1, 2009.

(51) Int. Cl.
| | | |
|---|---|---|
| H04W 64/00 | (2009.01) | |
| G01S 1/70 | (2006.01) | |
| B63J 3/04 | (2006.01) | |

(52) U.S. Cl.
CPC ..... *G01S 1/70* (2013.01); *B63J 3/04* (2013.01)
USPC ...................... 340/686.6; 340/853.2; 340/851

(58) Field of Classification Search
USPC ................ 340/825.28, 72, 686.6, 853.2, 851; 382/306; 367/3; 463/25; 362/477; 405/218; 114/45, 293; 361/823; 378/57
See application file for complete search history.

(56) References Cited

U.S. PATENT DOCUMENTS

| | | | | |
|---|---|---|---|---|
| 4,087,977 A | * | 5/1978 | Kuhlman | 405/218 |
| 4,873,600 A | * | 10/1989 | Vogele | 361/823 |
| 4,903,243 A | * | 2/1990 | Turner, Jr. | 367/3 |
| 5,664,513 A | * | 9/1997 | Echelbarger | 114/45 |
| 7,425,086 B2 | * | 9/2008 | Murphy | 362/477 |
| 2001/0050619 A1 | * | 12/2001 | Wiggerman et al. | 340/825.72 |
| 2003/0156039 A1 | * | 8/2003 | Tester | 340/825.28 |
| 2009/0324137 A1 | * | 12/2009 | Stallings et al. | 382/306 |
| 2012/0058818 A1 | * | 3/2012 | Kelly et al. | 463/25 |

OTHER PUBLICATIONS

International Search Report and Written Opinion for related international application No. PCT/US2010/058516 mailed on Mar. 15, 2011.

* cited by examiner

*Primary Examiner* — Steven Lim
*Assistant Examiner* — Kaleria Knox
(74) *Attorney, Agent, or Firm* — Billion & Armitage; Benjamin C. Armitage

(57) ABSTRACT

A marine lighting apparatus includes a decking material, a frame supporting the decking material, and a substantially sealed light device attached to a source of electrical power. At least a portion of the frame is located above water. The substantially sealed light device is attached to at least one of the frame and the decking material at a position below the decking material. A method for locating a mooring position in a marina includes sending a code, or a waypoint for locating the rented mooring position to a device of a mooring position user. The code is sent from the device of the mooring position user when the user is in the proximity of the mooring position. A waypoint may be entered into a gps to locate the slip. A unique vessel identifier broadcast from a vessel can also be used to enable a mooring position locator.

14 Claims, 9 Drawing Sheets

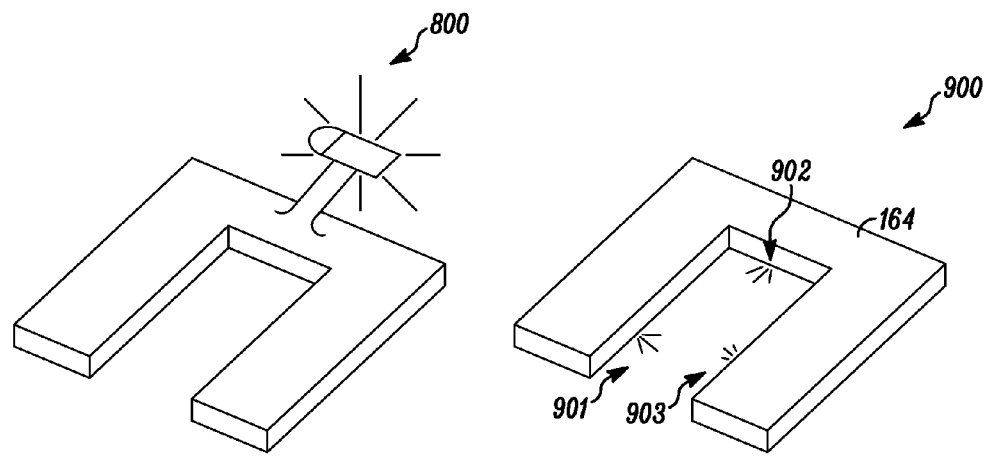
*FIG. 8*  *FIG. 9*
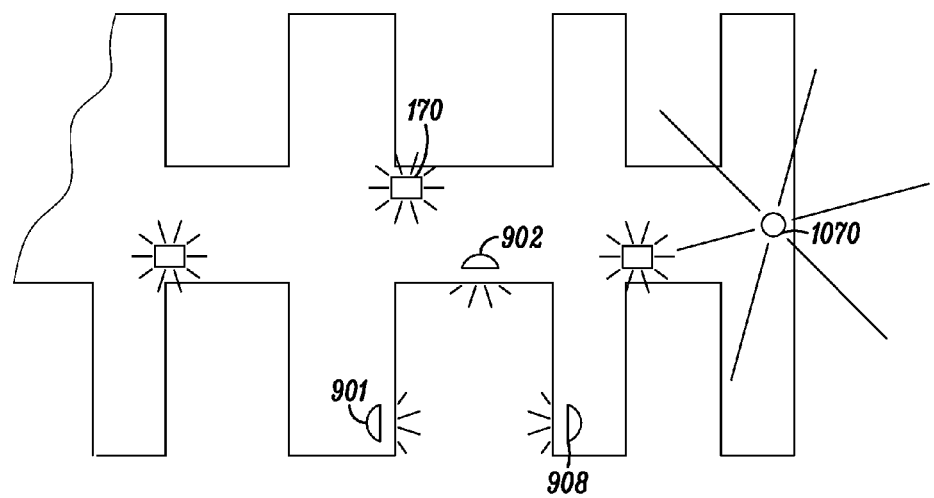
*FIG. 10*

__US 8,922,386 B2__

MARINE LIGHTING APPARATUS AND METHODS

CROSS-REFERENCES TO RELATED APPLICATIONS

This application is a Continuation-In-Part Application of PCT/US2010/058516, filed 1 Dec. 2010, which claims benefit of Ser. No. 61/265,694, filed 1 Dec. 2009 in the United States and which applications are incorporated herein by reference. A claim of priority to all, to the extent appropriate is made.

FIELD OF THE INVENTION

The present inventions relate to a marine lighting apparatus, devices and methods. More specifically, the marine lighting system is used in a marina.

BACKGROUND

A marina is a sheltered harbor where vessels, such as boats and yachts, are kept in the water and where services geared to the needs of recreational boating may be found.

The marina may have re-fueling, washing and repair facilities, ship chandlers, stores and restaurants. Marinas may include ground facilities such as parking lots for vehicles and boat trailers. The marina may also include storage facilities for storing boats outside the boating season.

In a marina, boats are moored either on buoys or on fixed or floating walkways that are tied to an anchoring piling by a roller or ring mechanism (floating docks or pontoons). A fixed or floating walkway is typically configured to form a number of boat slips having walkways near the boat on two or more sides of the boat or yacht. A slip may also be termed a mooring position. The slip also includes mooring points, such as cleats, on the top deck of the slip, to allow the vessel owner to moor his or her vessel to the slip. The slip may also include plug-ins to provide electrical power, telephone services and the like to the vessel.

A larger marina may have rows and rows of slips. The slips may also be of different sizes to accommodate different sized vessels. Most marinas have general lighting on light posts that extend well above the deck of the docks or walkways forming the slip. The general lights are spaced apart. Some slips may not be as well lit as some other slips. Some slips may also include supplemental lighting on a post attached to the decking material of the walkway. The lighting is generally above the gunwale of the vessel. With this type of lighting, it may be difficult to determine the spacing between the vessel and the slip during the mooring process, especially during the night or other low light times. It may even be difficult to determine the spacing between a vessel and the slip when the slip happens to be positioned near an overhead light in the marina. In addition, if the owner is unfamiliar with the location of the slip, it may be difficult to locate the slip during night time or other low light times. The same can happen to a vessel owner that is familiar with the marina should the owner become confused during night time or low light hours.

BRIEF DESCRIPTION OF THE DRAWINGS

FIG. 8 illustrates a view of a conventional light system at a boat slip.

FIG. 9 illustrates a view of a light system at a boat slip, according to an example embodiment.

FIG. 10 illustrates a view of a light system at a marina, according to an example embodiment.

Figure 1:
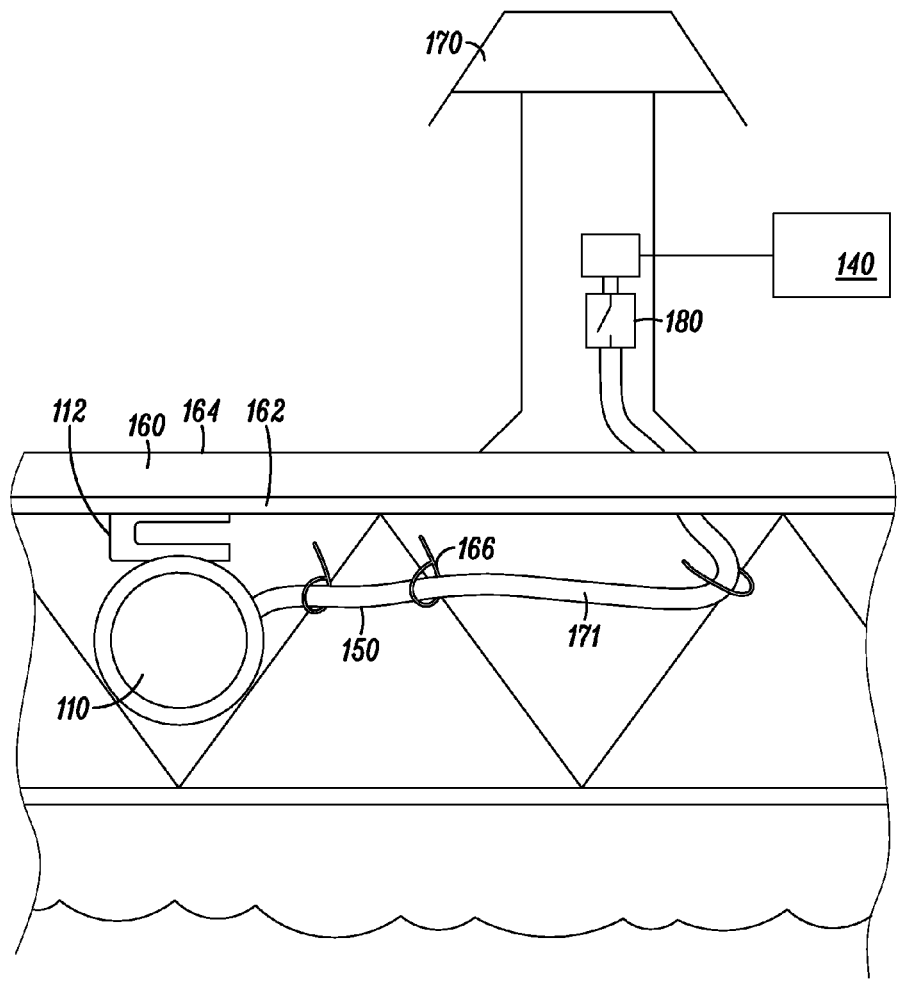
FIG. 1 illustrates an elevation view of a marine lighting apparatus, according to an example embodiment.

All Figures are illustrated for ease of explanation of the basic teachings of various embodiments of the present invention only; the extensions of the Figures with respect to number, position, relationship and dimensions of the parts to form the preferred embodiment(s) will be explained or will be within the skill of the art after the following description has been read and understood. Further, the exact dimensions and dimensional proportions to conform to specific force, weight, strength, and similar requirements for various applications will likewise be within the skill of the art after the following description has been read and understood.

Where used in various Figures of the drawings, the same numerals designate the same or similar parts. Furthermore, when the terms "top," "bottom," "right," "left," "front," "rear," "first," "second," "inside," "outside," and similar terms are used, the terms should be understood to reference only the structure shown in the drawings and utilized only to facilitate describing the illustrated embodiments. The terms should be understood to reference the structures shown in the drawings as they will typically be utilized by a rider of a vehicle including apparatus in accordance with the present inventions.

DETAILED DESCRIPTION

The Figures generally illustrate exemplary embodiments of marine lighting system and exemplary embodiments of various aspects of the marine lighting system. Also illustrated are methods for implementing aspects of the marine lighting system. These illustrated embodiments are not meant to limit the scope of coverage but, instead, to assist in understanding the context of the language used in this specification and in the appended claims. Accordingly, the appended claims may encompass variations of marine lighting system and methods for using the marine lighting system that differ from the illustrated embodiments.

FIG. 1 is an elevation view of a marine lighting apparatus 100, according to an embodiment of the invention. The marine lighting apparatus 100 includes at least one sealed light device 110 connected to a source of power 140 using an appropriate conductor 150. The sealed light 110, in one embodiment, is a low voltage light which is substantially waterproof. The sealed light 100 is generally available as a light used to lighted fountains, pools, or for another exterior landscaping application where the light device is exposed to the natural elements. However, conventional water lights of this type must be submerged to cool the lights. In an example, the lights of the present disclosure produce less heat than these conventional water lights. Such lights of the present disclosure are high output light emitting diodes (LED) or LED arrays. LED lights further use less power. Sealed light device 110 is designed to be water resistant as well as resistant to salt water and other corrosive elements. The sealed light 110, in some embodiments, is attached to a bracket 112 that carries the sealed light 110. The bracket 112, in turn, can be attached to another structure and, in some instances, includes mounting openings for receiving fasteners. Such substantially sealed lights are available from Focus Industries, Inc. of Lake Forest, Calif., USA as an Underwater Light SL-33 Series. Lights having the model numbers SL-33-AB or SL-33-AB-AC include a bracket, such as bracket 112. The bracket is also available from Focus Industries as Item Number RLLD3711FOC. The fasteners may be wood screws, sheet metal screws, plastic electrical tie downs, or the like. Bracket 112 can be adjustable to fix the light assembly, e.g., the lamp, lens and sealed housing, to the support structures and allows a front face (e.g., lens) of the light assembly to be positioned closely adjacent to an edge of the slip regardless of the position or type of the support structure to which the bracket is attached. The sealed housing can be manufactured of one or more of plastics, brass, aluminum and rubber. The bracket 112 can provide three degrees of movement to position the light assembly. In an embodiment, the bracket 112 can further pivot the light assembly to direct its light beam at most horizontally and, preferably, somewhat downwardly to reduce stray light that can produce light pollution at the boat slip, which can annoy fellow users of the marina.

As shown in FIG. 1, the sealed light 110 is attached to a portion of a structure that forms a slip or mooring position 160 of a marina or harbor. Only a portion of the slip or mooring position is shown in FIG. 1. The slip or mooring position 160 includes a decking material 164, and a frame 162 that supports the decking material 162. The frame 162 is typically supported by a series of floats or by a series of piers that extend to the bottom of the harbor or marina (not shown). The frame 162 is attached to the floats or the piers and includes a generally horizontal surface onto which decking 164 is attached. The decking 164 and the frame 162 are of sufficient strength to support a number of people and gear that are used in boating. The frame 162 can be a set of angle irons positioned between the floats or piers, or can be a truss structure positioned between the floats or piers. In other embodiments, such as a mooring position at a harbor, the frame 162 and decking 164 may be of sufficient strength to support heavy equipment that may be used to offload or load cargo onto a vessel, such as a ship. The frame 162 and decking 164, in this case, have the strength to support cargo, the heavy machinery necessary, and personnel needed to accomplish these tasks. In any event, a portion of the frame 162 is located above water.

As shown in FIG. 1, the substantially sealed light device 110 is attached to at least one of at least a portion of the frame 162 and/or a portion of the decking material 164. The substantially sealed light device 110 is attached at a position below the decking material 164, e.g., by a bracket 112. In one embodiment, the sealed light device 110 is positioned within the frame 162 used to support the decking material 164. In an embodiment, the sealed light device 110 is positioned above the water. The sealed light device 110 can be recessed or positioned substantially flush with respect to an edge of the frame 162 or the decking material 164 nearest the vessel. It is desirable that the sealed light device 110 is flushed or recessed to not contact a vessel in the slip. It is further desirable to position the light 110 recessed beneath the deck 164 with the deck overhanging the light to block some of the light broadcast from the light device 110. This will reflect stray light below the decking material and prevent light from spilling above the deck and bothering other users of the marina. To further affect the reduction of light pollution, the bracket 112 can be positioned to direct the light beam from the light device 110 downwardly toward the water.

The sealed light device 110 is electrically attached to a power source 140. The power source 140 can be a direct current or alternating current source. The power source 140 can include one or more of electrical grid power, fuel cells, solar power, primary and secondary batteries. In some embodiments, the sealed light device 110 is electrically attached to a pedestal 170 which is attached to the decking material 164 as shown. The pedestal 170 generally includes plug-ins to which a boat or vessel can attach power cords to power an electrical system associated with the vessel. The pedestal 170 can also include telephone service and other services that may be desired by people using a vessel. The pedestal 170 is generally also attached to the source of power 140. In the embodiment shown, the pedestal 170 acts as a junction box between the source of power 140 and the sealed light device(s) 110. As shown in FIG. 1, the sealed light device 110 is attached to the pedestal 170 by marine grade electrical conduit 171. The marine grade electrical conduit 171 can be attached to the frame 162 or the decking 164 using plastic tie downs, such as tie down 166. When the frame 162 is a truss type structure there are an increased number of points where the sealed light device 110 and the electrical conduit 171 can be attached. The truss structure also tends to provide protection for the substantially sealed light device 110. A switch 180 can also be placed in the line or electrical conduit 171. The switch 180 can further act as a step down transformer that takes the normal US household electrical signal (e.g., 110V, 60 Hz) to a 12 volt (or less) DC signal. The switch 180 can be a manual switch, or may be controllable by receiving a signal or other indication from a controller, a computer, a cell phone, a radio receiver or similar device. In other words, the switch, in one embodiment, can be enabled after a code is broadcast or in response to detecting a selected radio frequency signal. In some embodiments, the switch 180 can include a timer. The timer can be set so that the switch is enabled or in the "on" position for a selected amount of time. In other embodiments, the switch includes a light sensor and is enabled or turned "on" for a selected amount of time after a low light condition is detected by the light sensor. It should be noted that although the slip includes a pedestal 170 and the switch 180 is shown inside the pedestal 170, that in another embodiment the pedestal could be eliminated and the switch 180 could be placed in any of a number of locations between the source of power 140 and the sealed light device 110.

Figure 2:
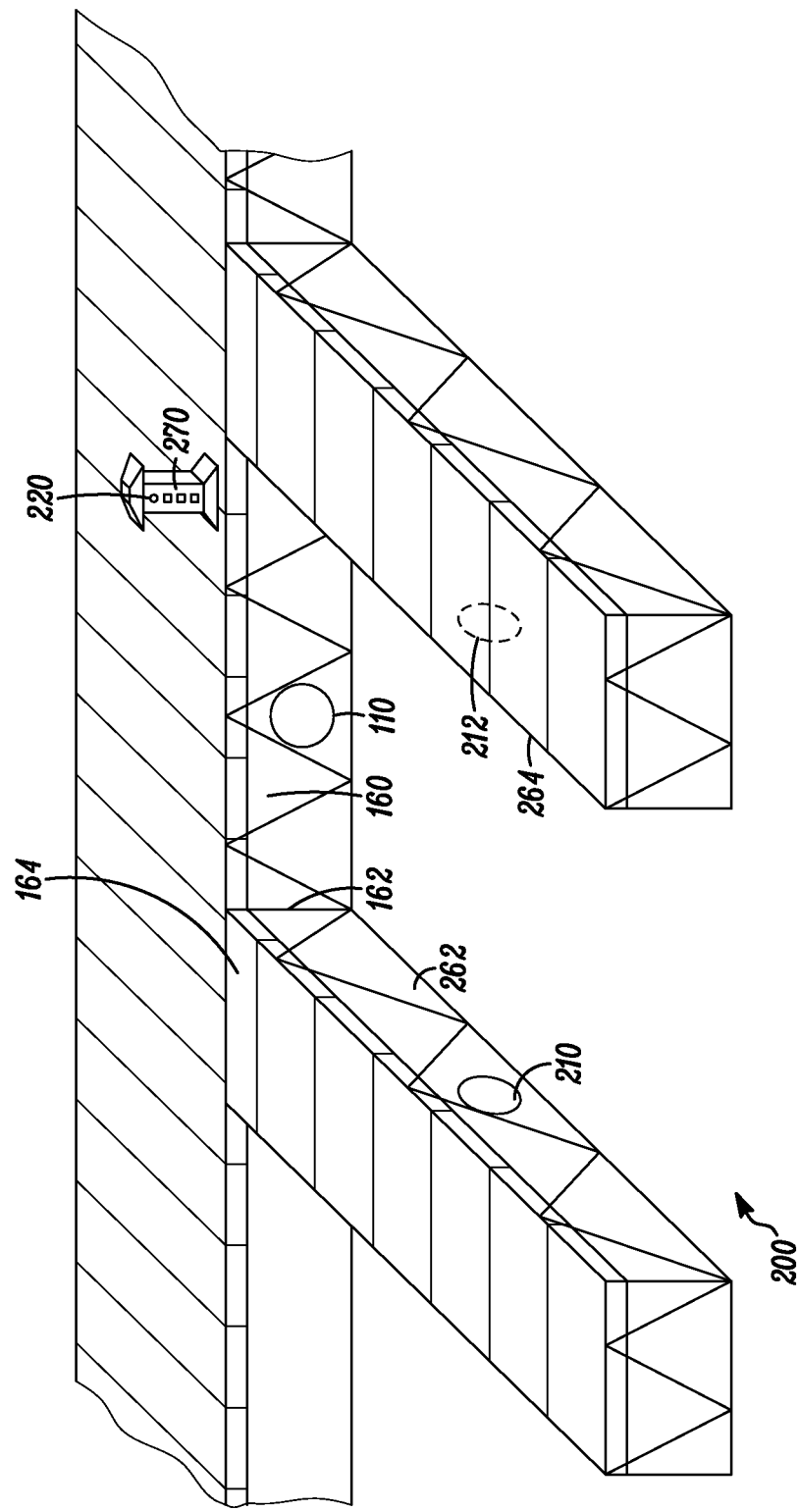
FIG. 2 illustrates another mooring position in the form of a slip in a marina, according to another example embodiment.

FIG. 2 shows another mooring position 160 that is in the form of a slip in a marina, according to another example embodiment. A marina generally will have a plurality of slips or mooring positions. Of course practices will vary widely among marinas, however, typically, a marina will have some slips rented on a per season basis, and some rental slips which can be rented for selected short periods of time, such as a night, weekend, week, or month. Slips can also be owned, e.g., similar to a co-op or a condominium arrangement. The mooring position 160 represents one of these mooring positions in the marina, and includes frame 162 and decking 164 in the form a structure that includes a first side 260 adapted to receive a bow of a vessel, a second side 262, and a third side 264. In other words, all but one side, typically the side associated with the stern of the vessel, are positioned near the structure or sides 260, 262, 264 of the slip. The marine lighting system 200 as shown in FIG. 2 includes the substantially sealed light device 110 associated with the first side 260, at least one of a substantially sealed light device 210 associated with the second side 262, and at least one of a substantially sealed light device 212 associated with the third side 264. The light device 110 associated with the first side 260 is at the closed end of the illustrated slip is positioned at the centerline of the slip. This light can help guide the boater to the center of the slip. Some mooring positions 160 or slips have a pedestal 270 attached to the frame 162 and/or decking 164. A source of electrical power 140 is attached to the pedestal 270. The substantially sealed light devices 110, 210, and 212 are electrically attached to the pedestal 270 using marine grade electrical conduit passing through the frame 162. The electrical conduit 171 (shown in FIG. 1) attaches each of the substantially sealed light devices 110, 210 and 212 to the pedestal 270 which acts as a junction box. The marine lighting apparatus 100 can also include a signal controlled switch 180 (shown in FIG. 1) electrically connected between the substantially sealed light device(s) 110 and the source of power. The marine lighting system 100 can also include a locating device 220 associated with the decking and frame. For example, the locating device 220 may be a series of colored lights that are switched on during low light times. The pattern or colors could be relayed via message, E-mailed, or otherwise communicated to the operator of the vessel that needs to locate the slip 160. The lights or locating device 220 can be attached to the pedestal 270 or to another structure associated with the mooring position 160. For example, lights may be attached to a pole that extends to a height greater than the pedestal 270 so that the locating device is more visible. It should be noted that the sealed light devices, such as lights 110, 210, 212 are spaced from one another by a selected distance. In one embodiment, the selected distance is in the range of 10-20 feet. In another embodiment, the selected distance is approximately 15 feet. Of course, a different slip can be of a different size to accommodate a different sized vessel. Side 160 varies with the beam of the vessel or boat while sides 262 and 264 vary with respect to the length of the vessel or boat. Generally, a spacing of 10-20 feet between lights is maintained in the marine lighting system. For example, if a yacht having a length of 30 feet is to occupy a slip, generally each side 262 and 264 will include a pair of substantially sealed lights.

Figure 3:
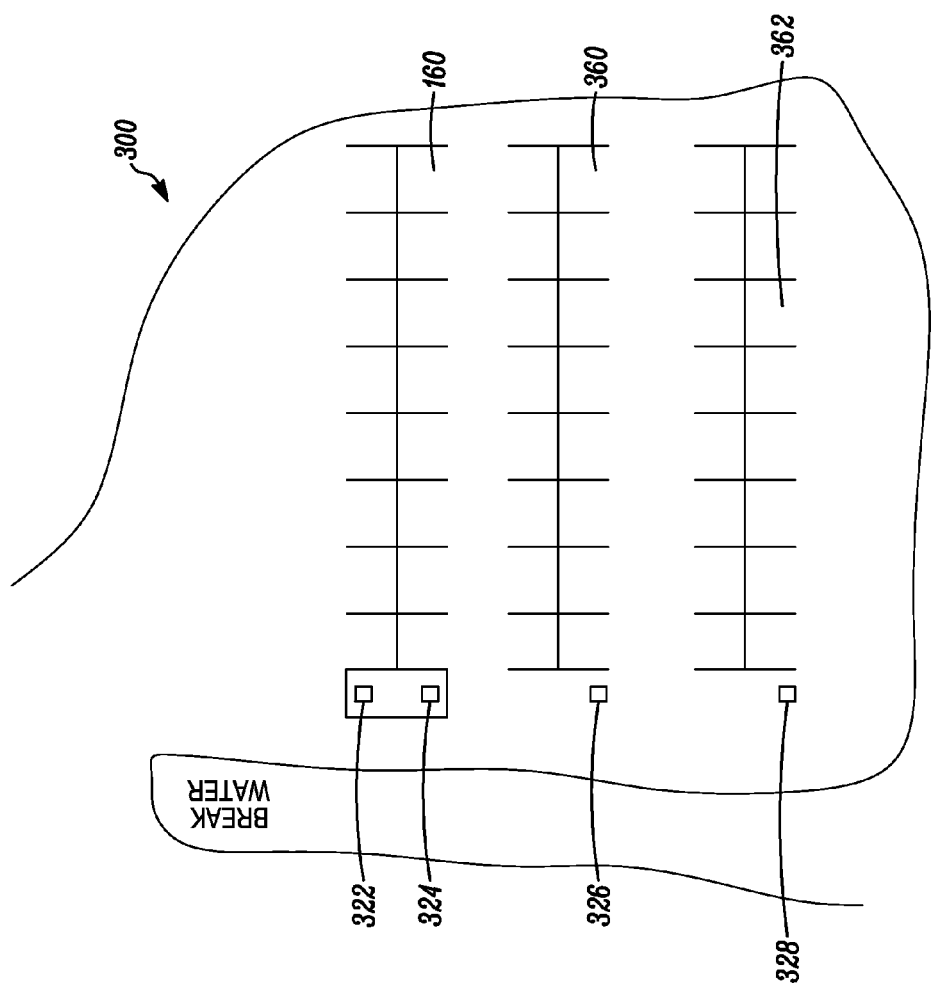
FIG. 3 illustrates a top view of a marina that includes markers for directing a vessel, according to an example embodiment.
Figure 4:
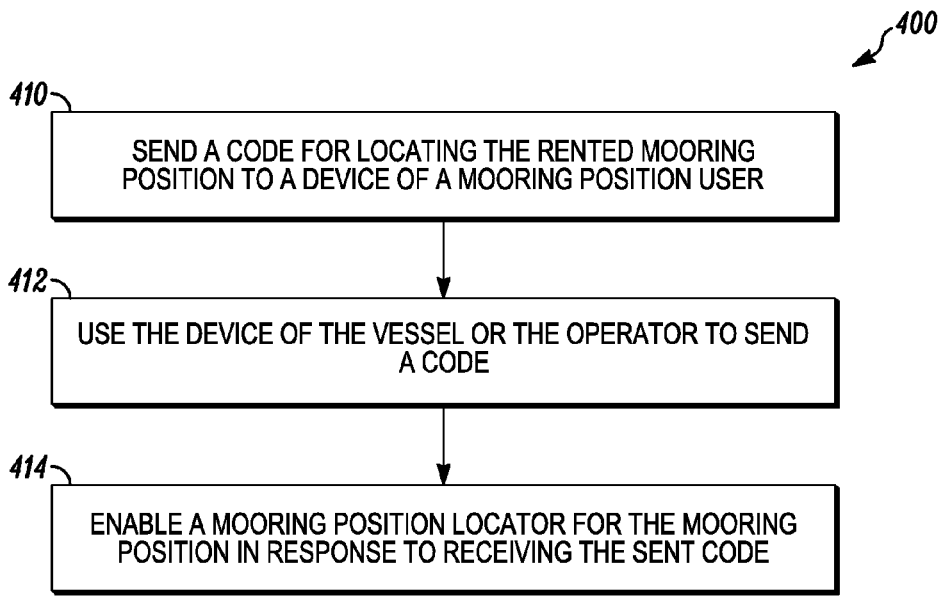
FIG. 4 illustrates a flow chart of a method for locating a mooring position within a harbor or marina, according to an example embodiment.
Figure 5:
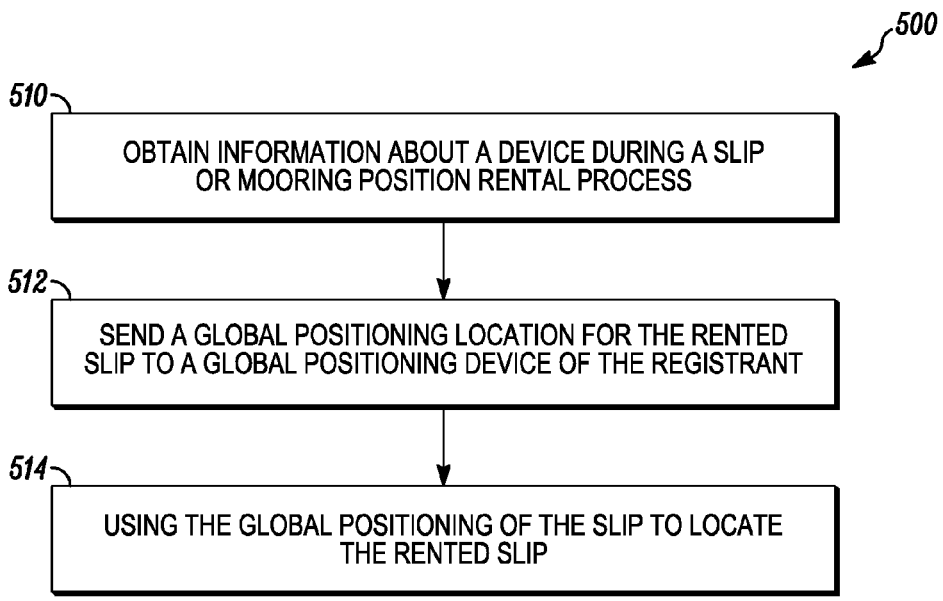
FIG. 5 illustrates a flow chart of another method for locating a mooring position within a harbor or marina, according to an example embodiment.
Figure 6:
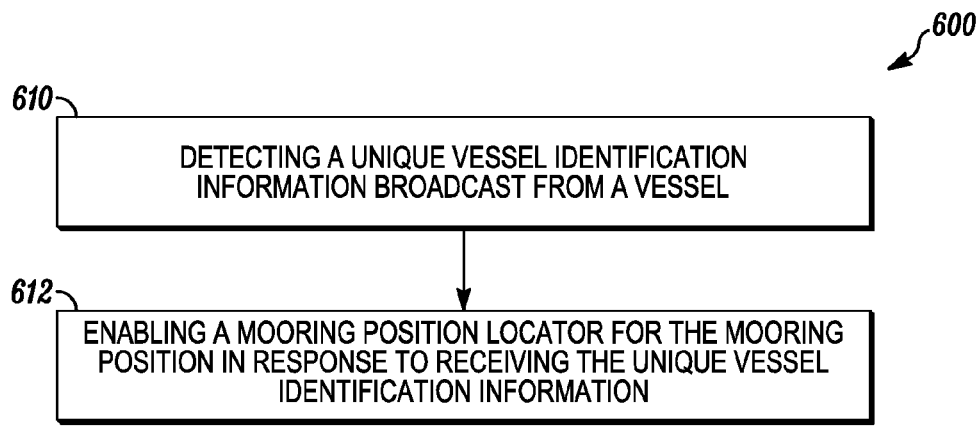
FIG. 6 illustrates a flow chart of a yet another method for locating a mooring position within a harbor or marina, according to an example embodiment.

As shown in FIGS. 2 and 3, the lights 110, 210, 212 are fixed to the dock structure, e.g., the frame under the deck, so that the lights have a fixed relationship to the water and the deck. Accordingly, the lights remain focused on the water and reduce the spill of ambient light above the dock. This will increase the enjoyment of other people at the dock, e.g., when a boater arrives at a marina late at night and, particularly when the boater is not familiar with the marina. When a boater is not familiar with marina, the boater may cruise the marina searching for the correct slip.

FIG. 3 is a top view of marina 300 that employs the marine lighting apparatus 100. The marina 300 includes another type of locating device 320. The marina 300 could be provided with at least one marker 322 that is lit when the vessel is near or in the marina. The marker 322, in some embodiments, can be lit when a rental is made. In some embodiments, such as the embodiment shown in FIG. 3, there may be several possible mooring positions 160, 360, 362. A vessel or boat could be directed toward anyone of these positions within the marina 300. In this embodiment, there would be a plurality of markers 322, 324, 326, 328. The markers 322, 324, 326, 328 could be backlit so that they are visible during low light conditions. In some embodiments, the markers 322, 324, 326, 328 could also be backlit during daytime hours to direct a vessel to a slip or mooring position. Selective ones of these markers 322, 324, 326, 328 could be enabled to direct a particular vessel or boat to one of several mooring positions 160, 360, and 362. For example, marker 324 could be lit to direct vessels to slip or mooring position 160, or marker 326 could be lit to direct a vessel to slip or mooring position 360, or marker 328 could be lit to direct a vessel to slip or mooring position 362. The markers 322 could also be lit to direct vessels to still other slips or mooring positions. More than one marker might be used to direct a vessel to a slip or mooring position, such as mooring position 362 which is in the sixth row of slips or mooring positions. In some embodiments, the markers 322, 324, 326, 328 or selected ones of the markers 322, 324, 326 and 328 could be lit for a selected amount of time, such as a time needed for the vessel to find a particular mooring position, and then disabled or turned off. It is contemplated that the markers 322, 324, 326 and 328 could be capable of several signals. For example, markers 322, 324, 326 may indicate a direction or indication to turn in one mode and a direction or indication to go forward in another mode. Different combinations of instructions could be used to direct a vessel to a slip or mooring position. Once the markers direct the vessel to a row, a marker 320 would allow the vessel to identify a particular slip or mooring position. Of course, the slip or mooring position, such as slip or mooring position 160, will be lit using substantially sealed lights 110, 210, 212 which will be a further indication of the slip or mooring position that is to be used. Once docked or moored within the slip or mooring position 160, the vessel may be attached to various services at the slip or mooring position. Attaching to one of these services, in one embodiment, would produce a signal to disable the lighting markers 322, 324, 326, 328. The signal could also start a timer which would, in turn, disable the marine lighting markers 322, 324, 326, 328 after a selected amount of time. In another embodiment, a switch could be provided to disable the lighting system 100.

A vessel owner or operator generally will contact a marina to rent a slip or mooring position. The vessel owner or operator can electrically contact the marina by phone, E-mail, or by way of an internet connection. This allows the vessel owner or operator to rent or register for a slip or mooring position in advance of arrival at the marina. Registration or renting will include gathering of contact information from the owner or operator as well as information about the vessel, such as the size of the vessel so that a properly sized slip can be rented. The information could also include other information about how the vessel is equipped. For example, the type of navigational devices and the type of radio communication equipment that the vessel is equipped with can be captured at the time of registration or rental. Radio or wireless communication can be over a variety of links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The information gathered may be input by the owner operator input the information over an internet connection. Marina personnel could also gather this sort of information by making inquiries over the phone of the owner or operator of the vessel. Alternatively, a person at the marina may enter information when determining to rent the slip or mooring position.

In an example, the marina can send a specialized communication device to the operator of the vessel upon registering the slip to the operator. The specialized communication device can be programmed to communicate with the switch or through a marina system to the slip light system, including light devices 110. The specialized communication device can wirelessly communicate over wireless networks, for example, over WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network.

Once the transaction for renting a mooring position or slip is complete, a method 400 for locating a mooring position in a marina includes sending a code for locating the rented mooring position to a device of a mooring position user 410. Such a method can be useful at anytime of day, but can be especially useful during low light conditions. The method is useful in preventing a vessel owner or operator from "cruising" the entire marina looking for a slip or mooring position during the night time when others may be sleeping, for example. The device can be a computer, a navigational device aboard the vessel or the like. The device, in an example, is a wireless mobile communication device, e.g., a cell phone, email device, instant messenger, etc. Such a device can communicate a code to the lighting switch or the marina computer system that communicates with the slip lighting system and/or the marina directional lighting system to selectively activate either the lighting system at a specific slip or the directional lighting system to a specific slip. For example, a navigational device may include a global positioning system capable of receiving and displaying one or more waypoints on a visual display. When the vessel or boat is near the marina or even when the vessel is within the marina, the owner operator can use the device of the vessel or operator device to send a code 412. In some embodiments, the code can be manually entered by the operator of the vessel into the device. In other embodiments, the code can be automatically uploaded to the device. A mooring position locator for the mooring position is enabled in response to receiving the sent code 414. For example, marker lights markers 322, 324, 326, 328 can be lit, and the sealed lights 110, 210, 212 of a mooring location 160 can be lit in response to receipt of a code by the marina lighting system. Sending a code for locating a rented mooring position to a device of the mooring position user can include electronically transmitting the location the user such as by an email, text, email, sending a phone number to a cell phone, etc. The operator of the vessel, when near the mooring position calls the phone number previously provided or texts an activation code to a provided number. Calling the phone number may also require inputting an extension number. Upon receiving the call, the mooring position locator for the mooring position is enabled. The marina can receive a phone call with a specific code or receives a phone call with a specifically dialed, extension triggers lighting of the mooring position. In some embodiments, triggering the lighting using the phone call also triggers lighting a directional signpost within the marina to direct the vessel to the correct mooring position. In some embodiments, a number of signposts or markers are enabled and deliver different instructions to direct the vessel to one of a number of possible mooring positions, such as mooring positions 160, 260, or 262. The signal can also enable or switch on a signal light 270 at the mooring position to direct the vessel to a selected slip or mooring position. In another embodiment, the coded signal may be as simple as making two transmissions over an assigned frequency associated with a marine radio. A transmission button could be manually hit two times in succession. This could be the code to enable the lighting system described above. In another embodiment, an activation code can be texted to a specific address.

Another method 500 for locating a slip or mooring position in a marina includes obtaining information about a device during a slip or mooring position rental process 510, sending a global positioning location for the rented slip to a global positioning device of the registrant 52, and using the global positioning location of the slip to locate the rented slip 514. In some embodiments, the device of the registrant is an onboard navigational device that includes a global positioning system. A waypoint is determined for each mooring position or slip, such as 160, 260 and 262. A handheld global positioning system, such as a Garmin Etrex HCx available from Garmin LTD of Grand Cayman Islands, is used to determine a waypoint. A waypoint is the measured position of a location on the earth in terms of longitude and latitude. A waypoint can be determined for each slip or mooring position 160, 260, 262. The positions of each slip in a marina can be determined using Real Time Kinematic (RTK) satellite navigation to provide the real-time corrections of the positioning signal down to a meter or centimeter level of accuracy. Upon registration, a slip is selected and the associated waypoint is communicated to the owner or operator of the vessel. In one embodiment, the owner or operator gets the waypoint and manually enters the waypoint on a global positioning system associated with the vessel. In one embodiment, the waypoint for the mooring position is sent directly to a device either associated with the vessel or associated with the owner or operator. The device can be a navigational aid aboard the vessel. In another embodiment, the device could be a smart phone. Many smart phones also include global positioning systems and applications. It is contemplated that a waypoint could be sent to the phone, such as in a text message or by E-mail. The text message or E-mail could merely be the waypoint information. The waypoint information could be copied and added to global positioning system application associated with the phone. It is also contemplated that entering a waypoint for use by a GPS application on an electronic device, smartphone, range finder, or other device, could be accomplished by tapping a touch screen display associated with the smart phone that is showing the waypoint. The waypoint is then used by the global positioning system application associated with the smart phone to determine the position of the smart phone with respect to the waypoint as the vessel nears the marina. The global positioning system could then be used to direct the vessel into the selected slip. It should be noted that a global positioning system is generally accurate to about 10 feet. When measuring the longitude and latitude of the slip location, the global positioning unit should be taken to a position near the mouth of the slip. This would make it less likely that the waypoint guide the vessel to a position across a row of slips. It should be noted that finding the selected slip would be confirmed by a locational device, such as signaling device 270, or by lights illuminating the slip or mooring position.

Still a further method 600 for locating a mooring position in a harbor includes detecting unique vessel identification information broadcast from a vessel 610, and enabling a mooring position locator for the mooring position in response to receiving the unique vessel identification information 612. In one embodiment, enabling a mooring locator 612 includes enabling lighted directions to the mooring location. In other embodiments, the mooring position can be illuminated using a set of lights, such as lights 110, 210, 212 for the purpose of identifying the location of the slip.

A vessel could be equipped with a transponder device. For example, larger vessels or ships are generally equipped with an Automatic Identification System (AIS). The AIS is a shipboard broadcast system that acts like a transponder, operating in the VHF maritime band that is capable of handling well over 4,500 reports per minute and updates as often as every two seconds. Shipboard AIS devices can use either Self-Organizing Time Division Multiple Access (SOTDMA) or Carrier-Sense Time Division Multiple Access (CSTDMA) technology.

There are two types of shipboard AIS available: Class A AIS using SOTDMA technology, for larger ships such as those subject to the Safety of Life at Sea Convention, and Class B AIS using CSTDMA technology, for smaller ships. Each Class A AIS system consists of a 12.5 W VHF transmitter, an integral global navigation satellite system (i.e. GPS) receiver, two VHF TDMA receivers, one VHF DSC receiver, and standard marine electronic data interface (IEC 61162/NMEA 0183) to shipboard display and sensor systems. Position is normally derived from an external navigation receiver and timing information derived from the integral GPS receiver, although the integral receiver does provide position information as a backup. Precise position information in coastal and inland waters is available too, from either a dGPS receiver or equivalent information broadcast by an AIS base station. Other information broadcast by the AIS, if available, is electronically obtained from shipboard equipment through marine data connections. Heading information and course and speed over ground would normally be provided by all AIS-equipped ships. Other information, such as rate of turn, angle of heel, pitch and roll, and destination and ETA could also be provided.

Class B AIS generally consists of a 2 W VHF transmitter, a GPS receiver and two VHF receivers, one of which is able to decode DSC transmissions as well as AIS.

The AIS transponder normally works in an autonomous and continuous mode, regardless of whether it is operating in the open seas or coastal or inland areas. Transmissions use 9.6 kb GMSK FM modulation using HDLC packet protocols. Although only one radio channel is necessary, each station transmits and receives over two radio channels to avoid interference problems, and to allow channels to be shifted without communications loss from other ships. The system provides for automatic contention resolution between itself and other stations, and communications integrity is maintained even in overload situations. Class A AIS can tune over the whole 156.025-162.025 MHz VHF maritime band, while Class B AIS is limited to 161.5-162.025 MHz.

Each Class A AIS station determines its own transmission schedule (slot), based upon data link traffic history and knowledge of future actions by other stations. Class B AIS is a "polite", listen-before-transmitting system that will transmit on the first available slot. A position report from one AIS station fits into one of 2250 time slots established every 60 seconds. AIS stations continuously synchronize themselves to each other, to avoid overlap of slot transmissions. Slot selection by a Class A AIS station is randomized within a defined interval, and tagged with a random timeout of between 0 and 8 frames. When a station changes its slot assignment, it pre-announces both the new location and the timeout for that location. In this way new stations, including those stations which suddenly come within radio range close to other vessels will always be received by those vessels.

In one embodiment, the marina is provided with an AIS receiver. The AIS receiver can be a single channel smart radio capable of receiving identifying information broadcast by vessels having an AIS transmitter. The AIS receiver can be used to identify when a vessel is near a marina or harbor. When the identified vessel is within a selected range of the marina, or more specifically within range of the AIS receiver, it can be used to trigger a signal to light any markers 322, 324, 326, 328 or locational signaling devices 270 associated with the mooring position or slip the vessel is to occupy. The received signal can also be used to enable sealed lights associated with the slip to be occupied, such as substantially sealed lights 110, 210, 212 associated with slip or mooring position 160.

In another embodiment, an internet site monitoring the AIS system, such as http://www.marinetraffic.com, is monitored to determine when a vessel is at a selected distance from a marina, harbor, or the mooring position. The internet site includes a page which monitors the vessels within a range. The internet page is listed below:

(http://www.marinetraffic.com/ais/datasheet.aspx?datasource=SHIPS_CURRENT&alpha=A&level0=200)

The internet site is set up so that it monitors an area including the marina. When the vessel enters this area, the vessel is listed on the internet site. The internet site could be surveyed periodically to search for matching ship identifiers. Once a matching identifier is found, the slip or mooring position is lit and any markers 322, 324, 326, and 328 for providing directions are light to direct the vessel to its mooring position or slip. The mooring positions could be enabled via a wireless signal or other radio frequency signal sent from a central computer. For example, a wireless LAN could be used to signal the switch 140 or otherwise enable markers 322, 324, 326, 328 (shown in FIG. 3). Once the location devices are enabled, they could stay on for a selected amount of time or be disabled by the act of the vessel attaching to services at the slip or mooring position 160.

Various implementations of the subject matter of the method and apparatus described above may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the method and apparatus described above may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The methods and apparatus described and contemplated above may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter of the present disclosure), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Figure 7:
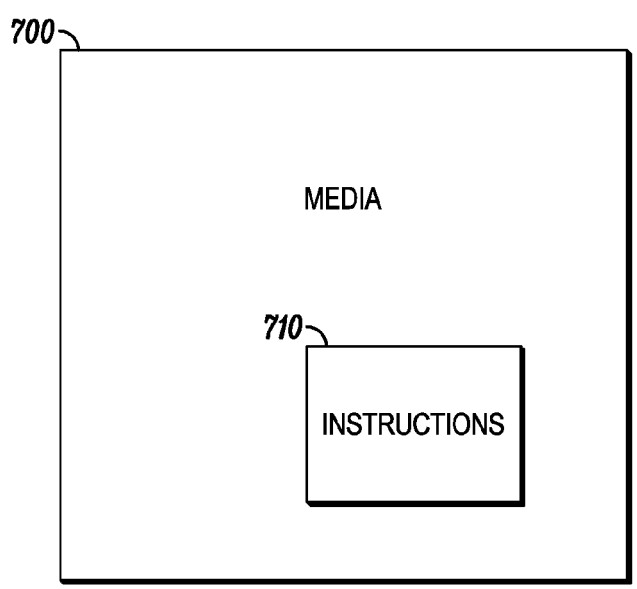
FIG. 7 illustrates a front view of an exemplary handguard system according to aspects of the present invention.

FIG. 7 is a schematic diagram of a computer readable medium 700, according to an embodiment of the invention. The computer readable media, which is sometimes referred to as machine readable medium, 700 includes a set of instructions 710 which are executable by a machine such as a computer system. When executed, the machine follows the instruction set 710. The computer readable media can be any type of media including memory, floppy disk drives, hard disk drive, a connection to the internet or even a server which stores the machine at a remote location. In an example, the medium 700 is tangible. The computer-readable medium or machine-readable medium 700 provides instructions that, when executed by a machine, cause the machine to perform the methods 400, 500 and 600 set forth above or variations thereof.

FIGS. 8 and 9 show views of a slip with a conventional light and an embodiment of a light system according to the systems described herein. As shown in FIG. 8, the conventional light illuminates a large area around the slip. Depending on the light, tens of other slips or more can be illuminated by the conventional light system 800. One conventional lighting system includes a plurality of pedestals having low level lighting along portions of the slip. The light in a pedestal is below a shade so as not to shine in others faces. These provide general lighting to the central walking deck of the slip. The light is also low level light so as not to disturb other users of the marina. Simply put, this lighting is inadequate for providing safe docking during night or other low light hours. In many installations, the slips include relatively deep tie downs to the free ends of the slip associated with the starboard and port sides of a vessel. An operator can break these tie downs when attempting to dock or moor at a mooring spot or slip. Breaking the tie down requires an expensive repair that must be performed by a diver. In the worst case scenario, an operator hitting the tie downs or corner of the free end of the slip can damage the hull of his or her vessel.

The FIG. 9 shows a version of a light system 900 of the present disclosure. Light is specifically directed to the area where the vessel will be moored. More specifically, the light is directed toward the water between the decks of the slip. Light system 900 includes lights that are positioned beneath the deck but above the water level. The lights 901, 902, 903 are directed inwardly toward the water within the slip. The deck 164 blocks the light from broadcasting upwardly toward other slips. The lights 901-903 can also be provided with shrouds that direct the light toward the water. It is further appreciated that lights 901-903 can be lower power than the convention light 800 as the lights are used in a more efficient manner by directed the light where it is needed as opposed to generally lighting the entire area around the slip in order to have sufficient light at the slip. In one embodiment, the lights include a plurality of LEDs. LEDs use less energy and are cool to the touch. The LEDs can be placed in a substantially waterproof light bulb.

FIG. 10 is a top view of a marina slip having lighting from pedestals, such as pedestal 170, general lighting 1070 and lighting from below deck lights 901, 902, 903. The intensity of the lights is represented by the length of the lines coming from the light source. The pedestal lights are more like theatre lighting so that the length of the lines are short. The pedestal lights 170 light the pathways. General lighting may be provided however, it is generally elevated to a position well above the walking surface and so the intensity of the light drops off significantly before lighting the water. The lights 901, 902, 903 are more intense lights directed at the water where the vessel will moor or land. The lights 901 and 903 are positioned at the free ends of the slip to enable the operator see sufficiently to miss the tied down ends of the slip. The light 902 is centered within the slip giving the operator a "target" on which to center the vessel during mooring. The light is directed toward the water and provides for more safer and efficient mooring during nighttime or other low light conditions.

Figure 11:
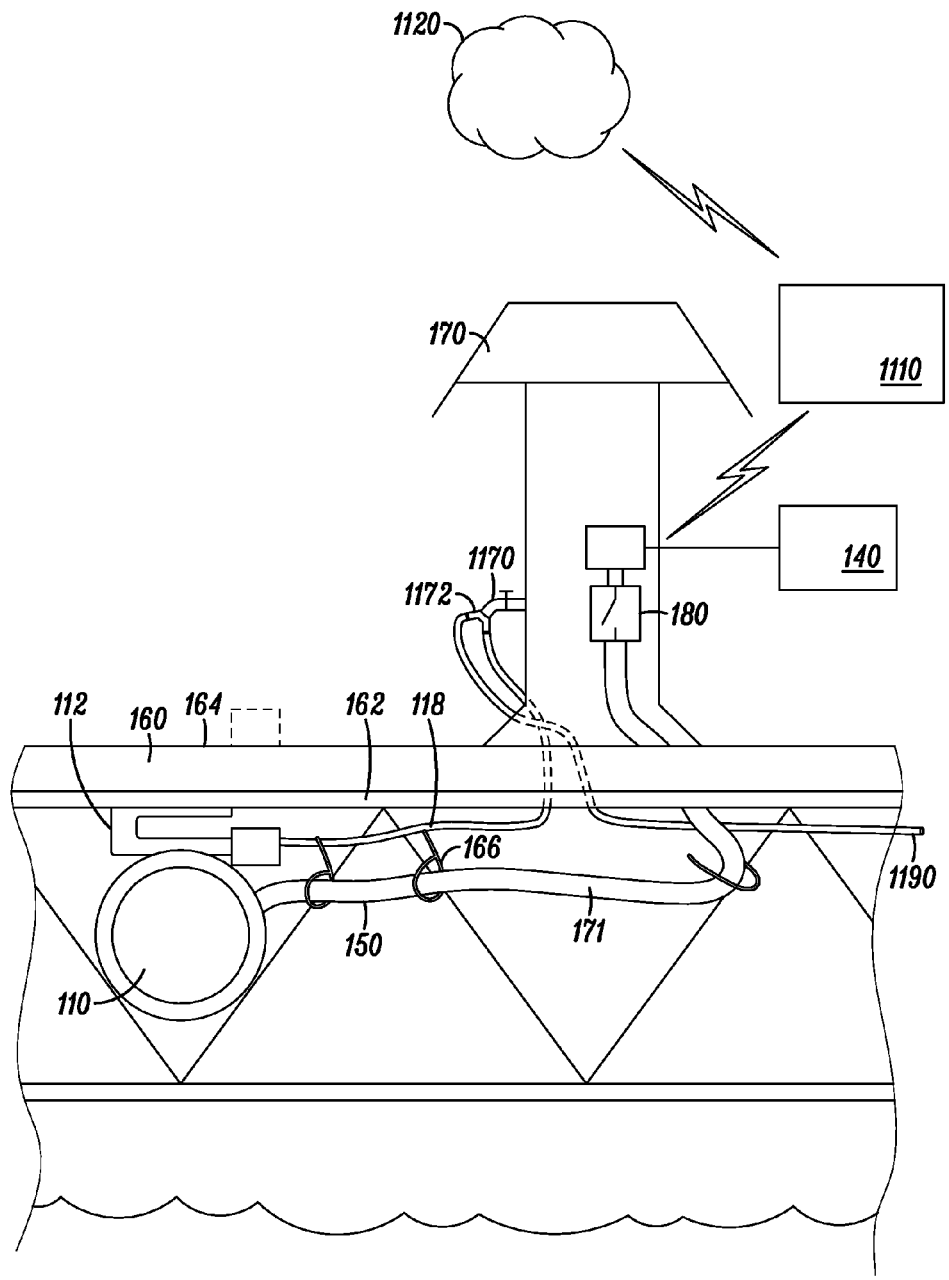
FIG. 11 illustrates an elevation view of a marine lighting apparatus with a global communication and utilities, according to an example embodiment.
Figure 12:
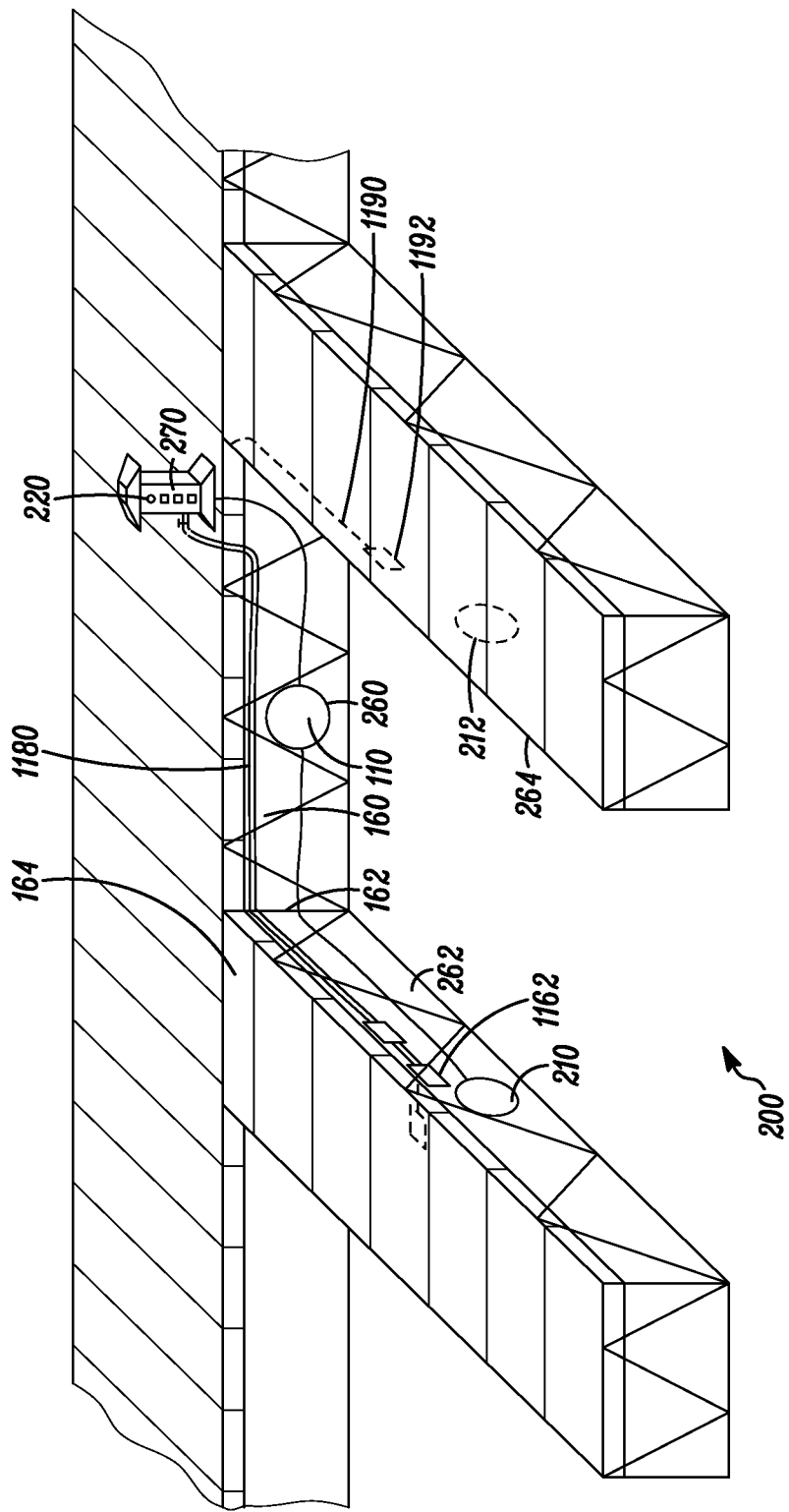
FIG. 12 illustrates a perspective view of a mooring position in the form of a slip in a marina including the lighting system of FIG. 11, according to another example embodiment.

FIGS. 11 and 12 show a further embodiment that includes a water supply system with the lighting systems described herein. The pedestal 170 at the mooring location or slip is connected to a source of water that can be used for various purposes. The pedestal includes a water spigot 1170. In one embodiment, a y-shaped splitter 1172 with separate shutoff valves is placed on the spigot 1170. A first hose 1180 is attached to one side of the y-shaped splitter 1172. A second hose 1190 is connected to the other side of the y-shaped splitter 1172. The end of the hose 1180 is provided with one half of a quick connect connector, such as the female end of a quick connector 1182. Similarly, other end of the hose 1190 is also provided with a quick connector 1192. The hoses 1180 and 1190 are connected below the decking of the slip. In one embodiment, the hoses 1180 and 1190 are connected along the same path as the electrical wire between the light 210 and the source of power and between the light 212 and the source of power. In other words, the wire for the lights can be bundled with a hose at the time of installation. A hose, not shown, that the slip user has access to or owns has two ends. One end includes the other half of the quick connector, such as a male half of the quick connect and the other end can be provided with a spray nozzle. The ends of the hose carrying the quick connectors 1182, 1192 can be placed about halfway down the distance of the slip on what would correspond to the starboard and port side of the vessel. In this way, the length of hose needed to wash down portions of the vessel would not have to be longer than necessary.

In operation, the slip user can connect to a quick connector 1182 or 1192 and control the valve at the y-shaped splitter 1172 to enable the flow of water in one of the hoses 1180, 1190. The hoses are attached below the deck to make for a much safer slip. The arrangement is also convenient for the slip owner in that a potential tripping hazard is substantially removed from the walking surface of the slip.

FIG. 12 also shows that power can be provided to the slip in a similar manner. A power cable 1270 has one end plugged into the power source at the pedestal 170. The power cable 1270 is also attached to a position underneath the deck of the slip. The distal end of the power cable is stowed below the deck when not in use. The distal end could be placed on the deck while the operator gets the mating portion of the power cable associated with the vessel. Again, most of the power cable is below the deck and so the slip is safer since yet another tripping hazard has been eliminated. In addition, the power cable can be bundled with one or both of the light 210, 212 wiring and the hose 1180, 1190 during installation.

Figure 13:
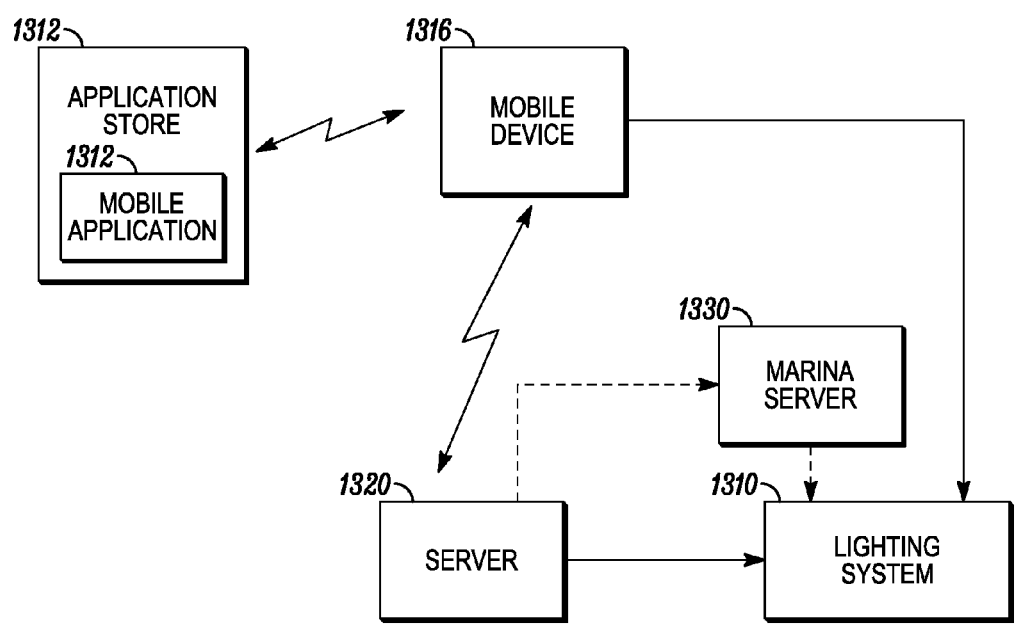
FIG. 13 illustrates a communication system for a marine lighting system, according to another example embodiment.

FIG. 13 shows a schematic of a communication/lighting system 1300 that includes a marine lighting system 1310, which can be a marine lights described herein. A server 1320 or other computer or communication unit is in electrical communication with the lighting system 1310 to control the operation of the lighting system 1310, e.g., to selectively turn on lights at a specific location in the lighting system 1310. The server 1320 can communicate with a plurality of lighting systems, each at different locations. The lighting systems 1310 can include a plurality of individual lights that can light a specific location. Each of the sets of lights at a location are individually addressable by the server 1320.

In an optional example, the server 1320 communicates with a marina server 1330 that in turn communicates with the lighting system 1310 to individually control sets of lights at a specific location, e.g., slip or path to a slip. Thus in this example, the server 1320 does not communicate direct with the lighting systems.

A mobile device 1316 can be a mobile phone, a portable computing machine, a net book, transmitter, or other communication device. The mobile device 1316 can access an application store 1312 and download control software and permissions, for example, in the form of a mobile application (sometimes referred to as a mobile app) 1314. The mobile application 1314 can be tangible, machine executable instructions for communication with the server 1320 or directly with the lighting system 1310. The mobile device 1316 once authorized by the server 1320 or by the mobile application 1314 can operate a set of lights assigned to the particular mobile device 1316.

Although a few variations have been described and illustrated in detail above, it should be understood that other modifications are possible. In addition it should be understood that the logic flow depicted in the accompanying figures and described herein do not require the particular order shown, or sequential order, to achieve desirable results. Other embodiments may be within the scope of the following claims.

As discussed above, the marine lighting apparatus 200 includes a decking material 164, a frame 162 supporting the decking material, and a substantially sealed light device 110 attached to a source of electrical power 140. At least a portion of the frame 162 is located above water. The substantially sealed light device 110 is attached to at least one of the frame 162 and the decking material 164 at a position below the decking material. In one embodiment, the sealed light device 110 is positioned within the frame 162. The sealed light device 110 may be recessed or positioned substantially flush with respect to an edge of the frame 162 or the decking material 164 nearest the vessel. The sealed light device 110 is a low voltage light such as a light used in a fountain, a pool, or other outdoor landscaping application. The sealed light device 110 is substantially waterproof. Mooring positions 160, 360, 362 can be in the form of a slip wherein the frame 162 and decking 164 form a structure that includes a first side 260 adapted to receive a bow of a vessel, a second side 262, and a third side 264. In other words, all but the stern of the vessel are positioned near the structure of the slip. The lighting system 200 includes a substantially sealed light device 110 associated with the first side 260, a substantially sealed light device 210 associated with the second side 262, and a substantially sealed light device 212 associated with the third side 264. A sealed light is positioned in each of the first, second and third sides of the slip. Some mooring positions or slips have a source of power 140 in the form of a pedestal 170, 270 attached to the frame 162 and decking 164. Electrical power is provided to the pedestal 170, 270. The substantially sealed light device 110, 210, 212 can be electrically attached to the pedestal 170, 270 with a wire 150 passing through the frame. The pedestal 170, 270 may act as a junction box. The marine lighting apparatus 200 can also include a locating device 220 associated with the decking 162 and frame 164. The marine lighting apparatus may also include a signal controlled switch 180 electrically connected between the substantially sealed light 110, 210, 212 and the source of power 140. In any of the above embodiments, the lights can be positioned above the water level and move up and down with the structure, e.g., the dock, to which the lights are fixed.

A method 400 for locating a mooring position in a marina includes sending a code for locating the rented mooring position to a device of a mooring position user 410, sending the code from the device of the mooring position user when the user is in the proximity of the mooring position 412, and enabling a mooring position locator for the mooring position in response to receiving the sent code 414. Sending a code 410 for locating a rented mooring position to a device of the mooring position user can include sending a phone number to a cell phone. Sending the code from the device of the mooring position user when the user is in the proximity of the mooring position 412 includes calling a phone number previously provided. Calling the phone number may also require inputting an extension number. Enabling a mooring position locator for the mooring position in response to receiving the code 414 includes lighting the mooring position 160, or lighting a directional signpost 322, 324, 326, 328 within the marina 300 remote from the mooring position, or enabling a signal light 220 at the mooring position 160.

A method 500 for locating a slip in a marina includes registering to rent a slip 510, sending a global positioning location for the rented slip to a global positioning device of the registrant 512, and using the global positioning location of the slip to locate the rented slip 514.

A method 600 for locating a mooring position in a harbor includes detecting unique vessel identification information broadcast from a vessel 610, and enabling a mooring position locator for the mooring position in response to receiving the unique vessel identification information 612. In one embodiment, enabling a mooring locator includes enabling lighted directions 322 to the mooring location 160.

The above disclosure refers to position navigation systems and Global Positioning System (GPS). It is within the scope of the present invention to use other types of navigational positioning systems. Other systems can include Beidou, COMPASS, Galileo, GLONASS, Indian Regional Navigational Satellite System (IRNSS), or QZSS. The systems can also use differential correction signals in North American from the FAA's WAAS satellites. Accordingly, references herein solely to GPS should be read to as general position navigation systems.

The foregoing discussion discloses and describes merely exemplary embodiments of the present inventions. Upon review of the specification, one skilled in the art will readily recognize from such discussion, and from the accompanying figures and claims, that various changes, modifications and variations can be made therein without departing from the spirit and scope of the invention as defined in the following claims.

What is claimed is:

1. A marine lighting apparatus, comprising:
   a decking material;
   a frame supporting the decking material, at least a portion of the frame generally above water, the decking and frame forming a portion of a mooring position;
   a source of electrical power;
   a substantially sealed light device attached to the source of electrical power, and the substantially sealed light device attached to at least one of the frame and the decking material at a position below the decking material; and
   a controller, adapted to at least receive a remote signal and affect the output of the light device;
   wherein when a remote signal associated with a marine vessel is generated, the light device is capable of both visually indicating a mooring or slip position and substantially illuminating the mooring or slip position below the decking material.

2. The marine lighting apparatus of claim 1, wherein the sealed light device is positioned within the frame.

3. The marine lighting apparatus of claim 1, wherein the sealed light device is recessed with respect to an edge of the frame or the decking material.

4. The marine lighting apparatus of claim 1, wherein the sealed light device is substantially flush with respect to an edge of the frame and the decking material.

5. The marine lighting apparatus of claim 1, wherein the sealed light device is a low voltage light.

6. The marine lighting apparatus of claim 1, wherein the sealed light device is substantially waterproof.

7. The marine lighting apparatus of claim 1, wherein the frame and decking form a structure further comprising:
   a first side adapted to receive a bow of a vessel;
   a second side;
   a third side, wherein the lighting system includes a substantially sealed light device associated with the first side, the second side and the third side.

8. The marine lighting apparatus of claim 1, wherein the source of power includes a pedestal attached to the frame and decking, the substantially sealed light device electrically attached to the pedestal with a wire passing through the frame.

9. The marine lighting apparatus of claim 1, further comprising a signal controlled switch electrically connected between the substantially sealed light and the source of power.

10. The marine lighting apparatus of claim 1, wherein the light device comprises one or more LED light sources.

11. The marine lighting apparatus of claim 1, wherein the source of electrical power comprises grid-based electrical power.

12. The marine lighting apparatus of claim 1, wherein the source of electrical power comprises solar power.

13. The marine lighting apparatus of claim 1, further comprising a plurality of light devices electrically connected in series.

14. A method for locating a mooring position in a harbor comprising:
   detecting a unique vessel identification information broadcast from a vessel;
   enabling a visual mooring position locator for the mooring position in response to receiving the unique vessel identification information; and
   enabling lighted directions to the slip or mooring location.

* * * * *